US009085202B2

(12) United States Patent
Haga

(10) Patent No.: US 9,085,202 B2
(45) Date of Patent: Jul. 21, 2015

(54) PNEUMATIC TIRE

(75) Inventor: Takafumi Haga, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 24 days.

(21) Appl. No.: 12/740,013

(22) PCT Filed: Oct. 29, 2008

(86) PCT No.: PCT/JP2008/069695
§ 371 (c)(1),
(2), (4) Date: Apr. 27, 2010

(87) PCT Pub. No.: WO2009/057663
PCT Pub. Date: May 7, 2009

(65) Prior Publication Data
US 2010/0252158 A1    Oct. 7, 2010

(30) Foreign Application Priority Data
Oct. 30, 2007 (JP) .................. 2007-281660

(51) Int. Cl.
*B60C 11/12* (2006.01)
*B60C 11/11* (2006.01)
(Continued)

(52) U.S. Cl.
CPC ......... *B60C 11/1369* (2013.04); *B60C 11/0306* (2013.04); *B60C 11/12* (2013.01);
(Continued)

(58) Field of Classification Search
CPC  B60C 11/1369; B60C 11/11; B60C 11/0306; B60C 11/0309; B60C 2011/0369; B60C 2011/0346; B60C 2011/0344; B60C 2011/0353; B60C 2011/0365; B60C 2011/0358; B60C 2011/0372; B60C 11/1307; B60C 11/12; B60C 11/0302
USPC ............................ 152/209.28, 209.22, 209.18
IPC .............................................. B60C 11/11, 11/12
See application file for complete search history.

(56) References Cited

U.S. PATENT DOCUMENTS

| 2,642,914 A | 6/1953 | Palko et al. |
| 4,823,855 A | 4/1989 | Goergen et al. |

(Continued)

FOREIGN PATENT DOCUMENTS

| EP | 586124 A1 * | 3/1994 | ............. B60C 11/04 |
| EP | 0 823 340 A1 | 2/1998 | |

(Continued)

OTHER PUBLICATIONS

English Language Machine Translation of JP2000-264019 (2000).*

(Continued)

*Primary Examiner* — Justin Fischer
*Assistant Examiner* — Philip N Schwartz
(74) *Attorney, Agent, or Firm* — Sughrue Mion, PLLC

(57) ABSTRACT

Outer longitudinal grooves extend in the circumferential direction of a pneumatic tire in a zigzag fashion. A plurality of first transverse grooves situated at an outer portion of a tread portion extend toward one side in a circumferential direction of the tire and is connected to the outer longitudinal grooves, as it gradually extends from an outer side of a width direction of the tire to an inner side thereof. A plurality of second transverse grooves situated at an inner portion of the tread portion extends toward the one side in the circumferential direction of the tire and is connected to outer longitudinal grooves, as it gradually extends from the inner side of the width direction of the tire to the outer side thereof. A position in the circumferential direction of the tire at which the plurality of first grooves are each situated in the outer portion and a position in the circumferential direction of the tire at which the plurality of second transverse grooves is each situated in the inner portion coincide with each other.

8 Claims, 2 Drawing Sheets

(51) Int. Cl.
*B60C 11/13* (2006.01)
*B60C 11/03* (2006.01)

(52) U.S. Cl.
CPC ........ *B60C 11/11* (2013.01); *B60C 2011/0344* (2013.04); *B60C 2011/0346* (2013.04); *B60C 2011/0353* (2013.04); *B60C 2011/0365* (2013.04); *B60C 2011/0369* (2013.04); *B60C 2011/0372* (2013.04)

(56) References Cited

U.S. PATENT DOCUMENTS

| | | | |
|---|---|---|---|
| 4,854,358 A * | 8/1989 | Takeuchi | 152/209.18 |
| 5,851,324 A * | 12/1998 | Oare et al. | 152/517 |
| 6,000,450 A | 12/1999 | Kishimoto et al. | |
| 6,003,574 A * | 12/1999 | Boiocchi et al. | 152/209.1 |
| 6,220,321 B1 * | 4/2001 | Yoshioka et al. | 152/209.18 |
| 6,604,564 B1 * | 8/2003 | Thiebaud | 152/209.21 |
| 6,695,024 B2 * | 2/2004 | Neugebauer et al. | 152/209.22 |
| 7,004,216 B2 * | 2/2006 | Godefroid | 152/209.18 |
| 8,261,790 B2 | 9/2012 | Wen et al. | |
| 2005/0211353 A1 * | 9/2005 | Bogenschuetz et al. | 152/209.1 |
| 2006/0102267 A1 | 5/2006 | Takahashi et al. | |
| 2006/0130950 A1 * | 6/2006 | Murata | 152/209.24 |
| 2007/0012389 A1 * | 1/2007 | Ito | 152/209.22 |

FOREIGN PATENT DOCUMENTS

| | | | |
|---|---|---|---|
| EP | 1 707 405 A1 | 10/2006 | |
| JP | 61-071203 | 4/1986 | |
| JP | 61-218406 A | 9/1986 | |
| JP | 01-81102 U | 5/1989 | |
| JP | 05024416 A * | 2/1993 | B60C 11/11 |
| JP | 07-285302 | 10/1995 | |
| JP | 09-188110 A | 7/1997 | |
| JP | 2000-264018 | 9/2000 | |
| JP | 2000-264019 A | 9/2000 | |
| JP | 2000238507 A | 9/2000 | |
| JP | 2004-098791 A | 4/2004 | |
| JP | 2006-143019 A | 6/2006 | |
| JP | 2006-151230 | 6/2006 | |
| JP | 2007-076594 A | 3/2007 | |
| JP | 2007-176282 A | 7/2007 | |
| JP | 2009-107471 A | 5/2009 | |

OTHER PUBLICATIONS

Partial human translation of JP2000-264019, 2000.*
European Search Report issued in European Application No. 08845474.9, dated Aug. 3, 2011.
International Search Report dated Jan. 13, 2009 (2 pages).
Japanese Office Action dated Feb. 5, 2013 issued in JP Patent Application No. 2007-281660.
Japanese Notice of Allowance dated Apr. 15, 2014, issued in corresponding Japanese Patent Application No. 2007-281660.
Japanese Office Action dated Sep. 24, 2014, issued in corresponding Japanese Patent Application No. 2014-013694.

* cited by examiner

PNEUMATIC TIRE

BACKGROUND OF THE INVENTION

1. Field of the Invention

The present invention relates to a pneumatic tire in which a tread portion has longitudinal grooves extending in a circumferential direction of the tire and transverse grooves extending in a width direction of the tire formed therein and a plurality of land portions are formed by the longitudinal grooves and the transverse grooves.

The present invention claims priority from Japanese Patent Application No. 2007-281660 filed on Oct. 30, 2007, which is hereby incorporated by reference herein.

2. Background Art

In this type of the pneumatic tire, hitherto, for example, as indicated in Patent Citation 1 as described, by making the positions of the transverse grooves in the circumferential direction of the tire, which are adjacent to each other in a width direction of the tire, different from each other, an increase in deformation such as a mutual collapse of each of land portions adjacent to each other in the width direction of the tire is prevented in order to suppress an occurrence of noise.

Herein, in general, in order to improve tire performance when wet, it is known that a so-called edge effect is enhanced by making the size of the land portion smaller in order to increase number of edges of the land portion, which are caught on a road surface, on a contact area. In addition, it is known that among the plurality of land portions formed in the tread portion, the land portions situated at either side of the width direction of the tire in the tread portion greatly contribute to an improvement in tire performance when wet.

[Patent Citation 1] Specification of Japanese Patent Application Laid-Open Publication No. 9-188110

However, if the size of the land portion is made small in order to improve tire performance when wet, there is a problem that noise easily generated because the distance between each of the transverse grooves, which are adjacent to each other in the width direction of the tire, are shortened in the circumferential direction of the tire.

Herein, in a pneumatic tire having low-profile with a small outer diameter, since a ground contact length along the circumferential direction of the tire becomes short, the tier performance when wet cannot be maintained unless the size of the land portion is made to be smaller. On the other hand, if the size of the land portion is made to be smaller in this manner, since the distances between each of the transverse grooves in the circumferential direction of the tire, which are adjacent to each other in the width direction of the tire, become shortened and noise easily generated, the above-mentioned problem arises.

SUMMARY OF THE INVENTION

The present invention provides a pneumatic tire which is capable of suppressing an occurrence of noise while maintaining good performance when wet.

According to a first aspect of the present invention, the pneumatic tire of the present invention relates to a pneumatic tire in which a tread portion has a plurality of longitudinal grooves extending in a circumferential direction of a tire and a plurality of transverse grooves extending in a width direction of the tire each formed thereon and a plurality of land portions are formed. In the tire of the present invention, outer longitudinal grooves, which are situated on either side of the width direction of the tire in the tread portion among the plurality of longitudinal grooves, extend in the circumferential direction of the tire in a zigzag fashion. Among the plurality of transverse grooves, a plurality of first transverse grooves, which are situated at an outer portion connected from an outer portion of the width direction of the tire in the outer longitudinal grooves in the tread portion, extend toward one side in the circumferential direction of the tire and is connected to the outer longitudinal grooves, as it gradually extends from an outer side of the width direction of the tire to an inner side thereof. Furthermore, a plurality of second transverse grooves, which are situated at an inner portion connected from an inner side of the width direction of the tire to the outer longitudinal groove in the tread portion, extend toward one side in the circumferential direction of the tire and is connected to the outer longitudinal grove, as it gradually extends from an inner side of the width direction of the tire to the outer side thereof. In addition, a position of the circumferential direction of the tire at which the plurality of first transverse grooves is each situated in the outer portion and a position of the circumferential direction of the tire at which the plurality of second transverse grooves is each situated in the inner portion coincide with each other.

In the present invention, because the outer longitudinal grooves extend in the circumferential direction of the tire in a zigzag fashion, it is possible to enhance the edge effect in the width direction of the tire which is exerted by the land portions formed in the outer longitudinal grooves.

In addition, the position of the circumferential direction of the tire at which the plurality of first transverse grooves is each situated in the outer portion and the position of the circumferential direction of the tire at which the plurality of second transverse grooves is each situated in the inner portion coincide with each other. For that reason, number of the edge of the land portion situated on the contact surface can be greatly increased, which makes it possible to reliably enhance the edge effect.

In addition, the plurality of first transverse grooves situated on the outer portion extend toward the one side in the circumferential direction of the tire, as it gradually goes from the outer side of the width direction of the tire to the inner side thereof, and the plurality of second transverse grooves situated on the inner portion extend toward the one side in the circumferential direction of the tire, as it gradually goes from the inner side of the width direction of the tire to the outer side thereof. The first transverse grooves and the second transverse grooves are connected to each other via the outer longitudinal grooves so as to form a V shape when seen from the plane of the tread portion. As a result, the edge, which is divided by the outer longitudinal grooves and the first transverse grooves in the outer land portion situated on the outer portion, and the edge, which is divided by the outer longitudinal grooves and the second transverse grooves in the inner land portion situated on the inner portion can be sharply pointed toward the one side in the circumferential direction of the tire, with the result that the edge effect of the circumferential direction of the tire can also be improved.

As a result, it is possible to improve the tire performance when wet such as a start property, a braking property and a turning property on a wet road surface, for example.

Furthermore, because the first transverse grooves and the second transverse grooves form the V shape as mentioned above, and are not connected in a linear shape in the width direction of the tire, it is possible to suppress an increase in deformation such as the mutual collapse of the inner land portion and the outer land portion which are adjacent to each other in the width direction of the tire. As a consequence, an occurrence of noise can be suppressed.

According to a second aspect of the present invention, slope angles of each of the first transverse grooves and the second transverse grooves relative to the width direction of the tire may be equal to or more than 10° and less than or equal to 25°.

In this case, it is possible to improve the tire performance when wet without generating so-called heel and toe wear in which one end side and the other end side of the circumferential direction of the tire are different from each other regarding the wear amount in each of a land portion.

Namely, if the slope angle becomes smaller than 10°, the edge effect of the circumferential direction of the tire cannot be exerted, and, as a result, the turning property is deteriorated, especially on the wet road surface. Furthermore, if the slope angle becomes larger than 25°, the edge, which is divided by the outer longitudinal grooves and the first transverse grooves in the outer land portion, and the edge, which is divided by the outer longitudinal grooves and the second transverse grooves in the inner land portion, are sharpened too much and the stiffness is deteriorated, thus the heel and toe wear may easily occur in the outer land portion and the inner land portion.

According to a third aspect of the present invention, in the outer longitudinal grooves, the first longitudinal grooves, which extend toward the one side in the width direction of the tire, as it gradually goes from one side of the circumferential direction of the tire to another side thereof, and the second longitudinal grooves, which extend toward the one side in the width direction of the tire, as it gradually goes from the one side in the circumferential direction of the tire to the another side thereof and have lengths shorter than those of the first longitudinal grooves, are connected alternately along the circumferential direction of the tire. Each of the widths of the first longitudinal grooves and the second longitudinal grooves is equal to or larger than 4 mm and less than or equal to 10 mm, and the sum of the slope angles of the first longitudinal grooves relative to the circumferential direction of the tire and the slope angles of the second longitudinal grooves relative to the circumferential direction of the tire may be equal to or larger than 50° and less than or equal to 70°.

In this case, it is possible to reliably produce the above-mentioned working effects. In other words, if the sum of the slope angles of the first longitudinal grooves and the slope angles of the second longitudinal grooves is less than 50°, it is difficult to exert edge effect of the width direction of the tire, and if the sum exceeds 70°, cracks may easily occur on the bottom surfaces of the second longitudinal grooves.

According to a fourth aspect of the present invention, the widths of the second transverse grooves are equal to or larger than 1.5 mm and less than or equal to 5.0 mm, thus may be narrower than those of the first transverse grooves.

In this case, since the widths of the second transverse grooves are equal to or larger than 1.5 mm and less than or equal to 5.0 mm, thereby being narrower than those of the first transverse grooves, it is possible to reliably improve the performance when wet without deteriorating wear resistance.

Namely, if the widths of the second transverse grooves are less than 1.5 mm, a drain property is deteriorated, and thus it may be difficult to improve the performance when wet, and if the widths of the second transverse grooves exceed 5.0 mm, ground contact pressures becomes higher, thus the wear resistance may decline.

According to a fifth aspect of the present invention, the pattern shape, which has been divided and formed by the longitudinal grooves and the transverse grooves in the tread portion, may be in an axisymmetric shape on the basis of an equatorial portion of the tire, and may have phase differences in the circumferential direction of the tire on either side with the equatorial portion of the tire sandwiched therebetween.

In this case, because the pattern shape formed on the tread portion is in an axisymmetric shape on the basis of the equatorial portion of the tire and has phase differences in the circumferential direction of the tire on either side with the equatorial portion of the tire sandwiched therebetween, it is possible to prevent the plurality of transverse grooves from being connected in the width direction of the tire over the equatorial portion of the tire, and thus the occurrence of noise can be reliably suppressed.

According to a sixth aspect of the present invention, between the second transverse grooves, which are adjacent to each other in the circumferential direction of the tire in the inner portion, a sipe extending in the width direction of the tire may be formed.

In this case, since the sipe is formed in the inner portion, it is possible to more reliably improve the edge effect.

Furthermore, it is desirable that the width of the sipe is equal to or less than 1 mm. If the width of the sipe becomes larger than 1 mm, the stiffness of the inner land portion may be decreased and thus the wear resistance may be decreased.

According to a seventh aspect of the present invention, each of the depths of the first transverse grooves and the second transverse grooves may be equal to or larger than 0.5 times and less than or equal to 1.0 times the depth of the outer transverse grooves.

In this case, it is possible to suppress a decline of the drain property and the occurrence of the heel and toe wear.

In other words, if each of the depths of the first transverse grooves and the second transverse grooves becomes less than 0.5 times the depth of the outer longitudinal grooves, good drain property cannot be exerted. Furthermore, if it exceeds 1.0 times, the deformation of the inner land portion and the outer land portion along the circumferential direction of the tire is increased, thus heel and toe wear easily occurs.

According to an eighth aspect of the present invention, among the wall surfaces forming the first transverse grooves, on the bottom surface, ridge portions, which connect both wall surfaces opposed to each other in the circumferential direction of the tire, protrude therefrom, and the heights thereof may be lower than the depths of the first transverse grooves.

In this case, because the ridge portions protrude from the bottom wall surfaces of the first transverse grooves, it is possible to suppress deformation of the outer land portion divided by the first transverse grooves along the circumferential direction of the tire, and thus the occurrence of heel and toe wear in the land portion can be reliably suppressed.

Furthermore, it is desirable that the sizes of the ridge portions in the width direction of the tire be equal to or larger than 0.3 times and less than or equal to 0.8 times the size of the outer land portion in the width direction of the tire, and, that the heights of the ridge portions be equal to or larger than 0.5 times and less than or equal to 0.8 times the depths of the first transverse grooves. In this case, it is possible to prevent decreases in the drain property by forming the ridge portions on the first transverse grooves.

According to a ninth aspect of the present invention, among the wall surfaces forming the first transverse grooves, both wall surfaces opposed to each other in the circumferential direction of the tire incline so as to gradually approach each other as they go to the bottom wall surface side, and the slope angles thereof relative to the diameter direction of the tire may be equal to or larger than 15° and less than or equal to 25°.

In this case, it is possible to suppress the deformation of the outer land portion along the circumferential direction of the tire, and thus occurrence of heel and toe wear can be prevented.

Furthermore, if the slope angle exceeds 25°, the widths of the first transverse grooves become wider and the ground area is decreased or the depths of the first transverse grooves become shallower, and thus wear resistance may decline.

According to the present invention, it is possible to suppress the occurrence of noise while maintaining the performance when wet of the pneumatic tire.

EXPLANATION OF REFERENCE

Figure 1:
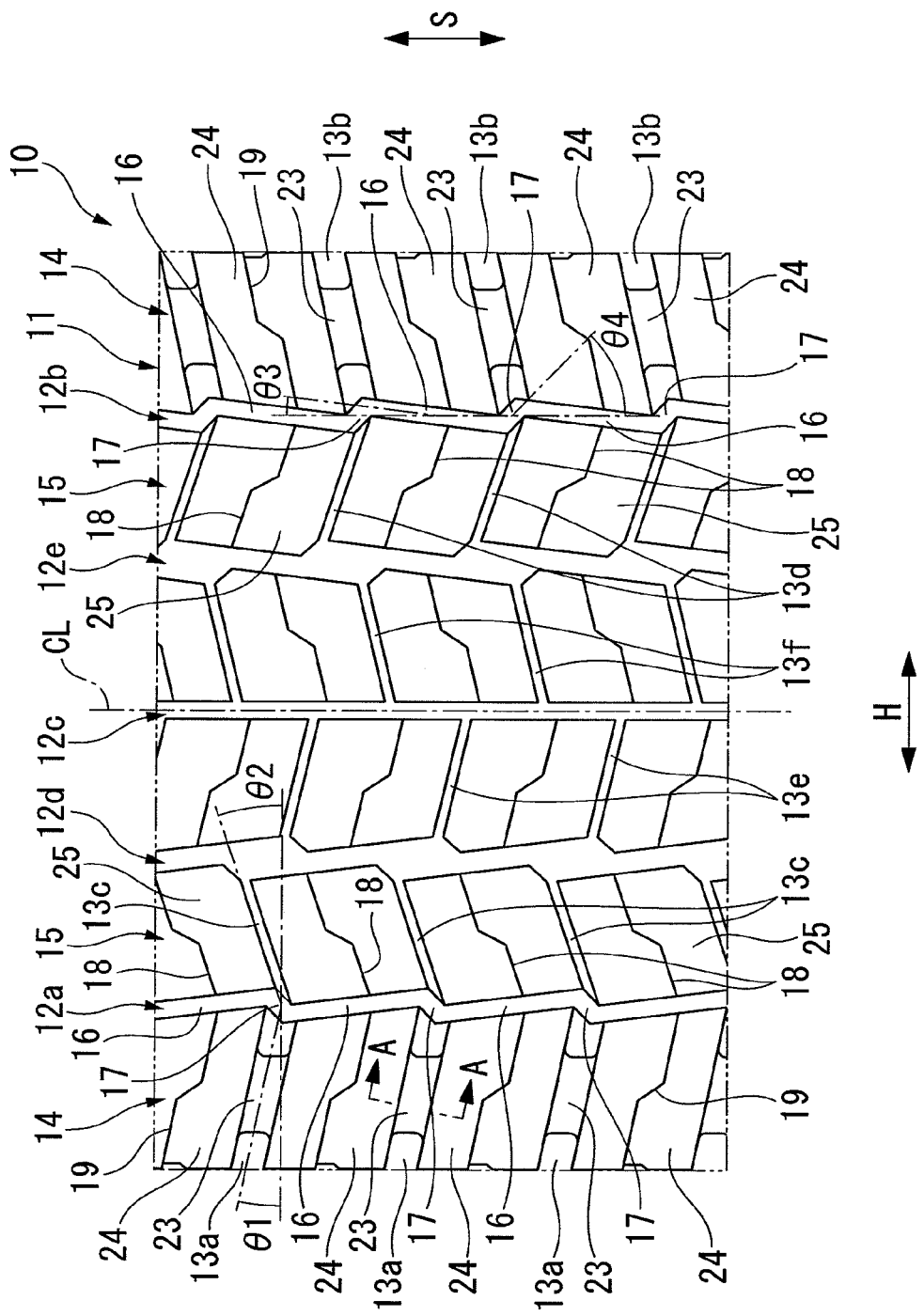
FIG. 1 is a partial plan view of a tread portion of a pneumatic tire in an embodiment according to the present invention.

10 PNEUMATIC TIRE
11 TREAD PORTION
12a to 12e LONGITUDINAL GROOVES
12a, 12b OUTER LONGITUDINAL GROOVES
13a to 13f TRANSVERSE GROOVES
13a, 13b FIRST TRANSVERSE GROOVES
13c, 13d SECOND TRANSVERSE GROOVES
14 OUTER PORTION
15 INNER PORTION
16 FIRST LONGITUDINAL GROOVES
17 SECOND LONGITUDINAL GROOVES
18 SIPES
21 BOTTOM WALL SURFACES
22 SIDE WALL SURFACES
23 RIDGE PORTIONS
24 OUTER LAND PORTIONS
25 INNER LAND PORTIONS
CL EQUATORIAL PORTION OF THE TIRE
H WIDTH DIRECTION OF THE TIRE
S CIRCUMFERENTIAL DIRECTION OF THE TIRE
θ1 to θ5 SLOPE ANGLES

DETAILED DESCRIPTION OF THE INVENTION

Hereinafter, an embodiment of a pneumatic tire relating to the present invention will be described with reference to FIGS. 1 and 2. A tread portion 11 of the pneumatic tire 10 has longitudinal grooves 12a, 12b, 12c, 12d and 12e extending in a circumferential direction S of the tire, and first transverse grooves 13a, 13b, 13c, 13d, 13e and 13f extending in a width direction H of the tire formed thereon. Furthermore, a plurality of land portions are formed by the longitudinal grooves 12a to 12e and transverse grooves 13a to 13f.

In addition, in the present embodiment, each of the depths of the longitudinal grooves 12a to 12e and the transverse grooves 13a to 13f are equal to each other. Furthermore, a carcass ply and a steel belt (not shown) or the like are embodied in a radially inner side of the tread portion 11 of the tire.

In addition, in the present embodiment, a plurality of longitudinal grooves 12a to 12e is formed at intervals in a width direction H of the tire, and among them, the outer longitudinal grooves 12a and 12b, which are situated on either side of the tread portion 11 in the width direction H of the tire, extend in the circumferential direction S of the tire in a zigzag fashion.

Furthermore, a center longitudinal groove 12c, which is situated at the center portion of the tread portion 11 in the width direction H of the tire, extends in parallel along the circumferential direction S of the tire.

Furthermore, in the present embodiment, among the plurality of transverse grooves 13a to 13f, in the tread portion 11, a plurality of first transverse grooves 13a and 13b, which is situated at an outer portion 14 connected to the outer longitudinal grooves 12a and 12b from the outer side of the width direction H of the tire, extend toward one side in the circumferential direction of the tire and are connected to the outer longitudinal grooves 12a and 12b, as it gradually go from the outer side of the width direction of the tire to the inner side thereof.

In addition, among the plurality of transverse grooves 13a to 13f, in the tread portion 11, a plurality of second transverse grooves 13c and 13d, which is situated at an inner portion 15 connected to the outer longitudinal grooves 12a and 12b from the inner side of the width direction H of the tire, extend toward one side in the circumferential direction S of the tire and are connected to the outer longitudinal grooves 12a and 12b, as it gradually go from the inner side of the width direction H of the tire to the outer side thereof.

Furthermore, the position of the circumferential direction of the tire at which the plurality of first transverse grooves 13a and 13b are each situated in the outer portion 14, and the position of the circumferential direction of the tire at which the plurality of second transverse grooves 13c and 13d are each situated in the inner portion 15 coincide with each other.

In this manner, the first transverse grooves 13a and 13b and the second transverse grooves 13c and 13d, which are adjacent to each other in the width direction H of the tire, form a V shape when seen from the plan of the tread portion 11, and are connected to each other via the outer longitudinal grooves 12a and 12b. Furthermore, the widths of the second transverse grooves 13c and 13d are equal to or larger than 1.5 mm and less than or equal to 5.0 mm and are narrower than the widths of the first transverse grooves 13a and 13b.

In addition, in the outer portion 14, outer land portions 24 are formed by the outer longitudinal grooves 12a and 12b and the first transverse grooves 13a and 13b, and a plurality of outer land portions 24 are arranged along the circumferential direction S of the tire via the first transverse grooves 13a and 13b. Furthermore, in the inner portion 15, inner land portions 25 are formed by the inner longitudinal grooves 12d and 12e, which are situated between the outer longitudinal grooves 12a and 12b and the center longitudinal groove 12c among the plurality of longitudinal grooves 12a to 12e, the outer longitudinal grooves 12a and 12b, and the second transverse grooves 13c and 13d. The plurality of inner land portions 25 are arranged along the circumferential direction S of the tire via the second transverse grooves 13c and 13d.

Herein, the outer longitudinal grooves 12a and 12b are configured in such a manner that first longitudinal grooves 16 and second longitudinal grooves 17 are alternately connected along the circumferential direction S of the tire, the first longitudinal grooves 16 extends toward the outer side (one side) of the width direction H of the tire, as it gradually goes from the one side in the circumferential direction S of the tire to another side thereof, and the second longitudinal grooves 17 extends toward the inner side (another side) of the width direction H of the tire, as it gradually goes from the one side in the circumferential direction S of the tire to another side thereof and have lengths shorter than those of the first longitudinal grooves 16. Furthermore, in the present embodiment, the first transverse grooves 13a and 13b and the second transverse grooves 13c and 13d, which are adjacent to each other in the width direction H of the tire, are connected to each other via the second longitudinal grooves 17 of the outer longitudinal grooves 12a and 12b.

Furthermore, in the present embodiment, the slope angles θ1 and θ2 of each of the first transverse grooves 13a and 13b and the second transverse grooves 13c and 13d relative to the width direction H of the tire are equal to or larger than 10° and less than or equal to 25°. Furthermore, the widths of each of the first longitudinal grooves 16 and the second longitudinal grooves 17 are equal to or larger than 4 mm and less than or equal to 10 mm, and the sum of slope angles θ3 of the first longitudinal grooves 16 relative to the circumferential direction S of the tire and slope angles θ4 of the second longitudinal grooves 17 relative to the circumferential direction S of the tire are equal to or larger than 50° and less than or equal to 70°.

In addition, in the present embodiment, the widths of each of the first longitudinal grooves 16 and the second longitudinal grooves 17 are equal to each other. Furthermore, the slope angles θ1 and θ2 of the first transverse grooves 13a and 13b and the second transverse grooves 13c and 13d relative to the width direction H of the tire are equal to each other.

Furthermore, the depths of each of the first transverse grooves 13a and 13b and the second transverse grooves 13c and 13d are equal to or larger than 0.5 times and less than or equal to 1.0 times the depths of the outer longitudinal grooves 12a and 12b. In the present embodiment, the depths of each of the first transverse grooves 13a and 13b and the second transverse grooves 13c and 13d are equal to each other and are shallower than those of the outer longitudinal grooves 12a and 12b.

Furthermore, between the second transverse grooves 13c and 13d, which are adjacent to each other in the circumferential direction S of the tire in the inner portion 15, i.e., on the inner land portions 25, sipes 18 extending in the width direction H of the tire are formed.

In the present embodiment, the sipes 18 extend substantially in parallel along the extending direction of the second transverse grooves 13c and 13d. Furthermore, in the present embodiment, between the first transverse grooves 13a and 13b, which are adjacent to each other in the circumferential direction S of the tire in the outer portion 14, i.e., on the outer land portions 24, sipes 19 are also formed, and the sipes 19 extend substantially in parallel along the extending direction of the first transverse grooves 13a and 13b.

Furthermore, ridge portions 23, which connect both wall surfaces 22 opposed to each other in the circumferential direction S of the tire, protrude from the bottom wall surface 21, among the wall surfaces forming the first transverse grooves 13a and 13b, and the heights thereof are lower than the depths of the first transverse grooves 13a and 13b. In the present embodiment, the sizes of the ridge portions 23 in the width direction of the tire are equal to or larger than 0.3 times and less than or equal to 0.8 times the sizes of the outer land portions 24 in the width direction of the tire, and the heights of the ridge portions 23 are equal to or larger than 0.5 times and less than or equal to 0.8 times the depths of the first transverse grooves 13a and 13b.

In addition, both wall surfaces 22 of the first transverse grooves 13a and 13b incline such that they gradually approach each other as they approach the bottom wall surface 21 side, and the slope angles θ5 relative to the diameter direction of the tire are equal to or larger than 15° and less than or equal to 25°.

Furthermore, the pattern shapes, which are divided and formed by the longitudinal grooves 12a to and 12e and the transverse grooves 13a to 13f on the tread portion 11, are axisymmetric shapes on the basis of the equatorial portion CL of the tire, and have phase differences in the circumferential direction S of the tire on either side with the equatorial portion CL of the tire sandwiched therebetween. Herein, in the present embodiment, the sizes of the outer land portions 24 and the inner land portions 25 in the circumferential direction S of the tire are equal to each other, and the phase differences are equal to or larger than ⅓ times and less than or equal to ⅔ times the sizes of the outer land portion 24 and the inner land portion 25 in the circumferential direction S of the tire.

As described above, according to the pneumatic tire 10 of the present embodiment, the outer longitudinal grooves 12a and 12b extend in the circumferential direction S of the tire in the zigzag fashion. As a result, it is possible to enhance the edge effect of the width direction H of the tire which is exerted by the outer land portions 24 and the inner land portions 25 formed by the outer longitudinal grooves 12a and 12b.

In addition, the position of the circumferential direction of the tire at which the plurality of first transverse grooves 13a and 13b are each situated on the outer portions 14 and the position of the circumferential direction of the tire at which the plurality of second transverse grooves 13c and 13d are situated on the inner portions 15 coincide with each other. As a result, it is possible to situate many of the edges of the land portions on the ground surface, which can reliably enhance the edge effect.

In addition, the plurality of the first transverse grooves 13a and 13b situated on the outer portion 14 extend toward the one side in the circumferential direction S of the tire, as it gradually go from the outer side of the width direction H of the tire to the inner side thereof, and the plurality of the second transverse grooves 13c and 13d situated on the inner portion 15 extend toward the one side in the circumferential direction of the tire, as it gradually go from the inner side of the width direction H of the tire to the outer side thereof. In addition, the first transverse grooves 13a and 13b and the second transverse grooves 13c and 13d are connected to each other via the outer longitudinal grooves 12a and 12b such that they form a V shape when seen from a plan view of the tread portion 11. As a result, the edges, which are divided by the outer longitudinal grooves 12a and 12b and the first transverse grooves 13a and 13b in the outer land portions 24 situated on the outer portion 14, and the edges, which are divided by the outer longitudinal grooves 12a and 12b and the second transverse grooves 13c and 13d in the inner land portions 25 situated on the inner portion 15, can be sharply pointed toward the one side of the circumferential direction S of the tire, which also makes it possible to improve the edge effect of the circumferential direction S of the tire.

Thus, for example, the wet performances such as a starting property, a braking property and a turning property on the wet road surface can be improved.

In addition, the first transverse grooves 13a and 13b and the second transverse grooves 13c and 13d form the V shape as described above, and are not connected in a linear shape in the width direction H of the tire. For this reason, it is possible to suppress an increase in deformation such as the mutual collapse of the outer land portions 24 and the inner land portions 25 which are adjacent to each other in the width direction H of the tire, which can suppress the occurrence of noise.

Furthermore, in the present embodiment, the slope angles θ1 and θ2 of each of the first transverse grooves 13a and 13b and the second transverse grooves 13c and 13d relative to the width direction H of the tire are equal to or larger than 10° and less than or equal to 25°. For that reason, it is possible to improve the performance when wet without easily generating so-called heel and toe wear in which the one end side of the circumferential direction S of the tire is different from another end side thereof regarding the wear amount in each of the outer land portion 24 and the inner land portion 25.

Furthermore, in the present embodiment, in the outer longitudinal grooves 12a and 12b, the widths of each of the first longitudinal grooves 16 and the second longitudinal grooves 17 are equal to or larger than 4 mm and less than or equal to 10 mm, and the sum of the slope angles θ3 of the first longitudinal grooves 16 relative to the circumferential direction S of the tire and the slope angles θ4 of the second longitudinal grooves 17 relative to the circumferential direction S of the tire is equal to or larger than 50° and less than or equal to 70°. For that reason, it is possible to reliably produce the above-mentioned working effect without easily generating cracks on the bottom surface of the second longitudinal grooves 17.

In addition, in the present embodiment, the widths of the second transverse grooves 13c and 13d are equal to or larger than 1.5 mm and less than or equal to 5.0 mm, and are narrower than those of the first transverse grooves 13a and 13b. For that reason, it is possible to reliably improve the wet performance without decreasing the wear resistance.

Furthermore, the pattern shape formed on the tread portion 11 is in an axisymmetrical shape on the basis of the equatorial portion CL of the tire, and has phase differences in the circumferential direction S of the tire on either side with the equatorial portion CL of the tire sandwiched therebetween. For that reason, it is possible to prevent the plurality of transverse grooves 13a to 13f from extending in the width direction H of the tire over the equatorial portion CL of the tire, which makes it possible to reliably suppress the occurrence of the noise.

In addition, since the sipes 18 are formed on the inner portions 15, the edge effect can be more reliably improved. Furthermore, since the widths of the sipes 18 are equal to or less than 1 mm, it is possible to prevent the stiffness of the inner land portion 25 from declining due to the forming of the sipes 18, which results in the decline of the wear resistance.

Furthermore, the depths of each of the first transverse grooves 13a and 13b and the second transverse grooves 13c and 13d are equal to or larger than 0.5 times and less than or equal to 1.0 times of the depths of the outer longitudinal grooves 12a and 12b, which makes it possible to suppress deterioration of the drain property and the occurrence of heel and toe wear.

In addition, since the ridge portions 23 protrude from the bottom wall surfaces 21 of the first transverse grooves 13a and 13b, it is possible to suppress deformation of the outer land portions 24 formed by the first transverse grooves 13a and 13b along the circumferential direction S of the tire. For this reason, it is possible to reliably suppress the occurrence of heel and toe wear in the land portions 24. Furthermore, the sizes of the ridge portions 23 in the width direction H of the tire are equal to or larger than 0.3 times and less than or equal to 0.8 times the sizes of the outer land portions 24 in the width direction H of the tire, and the heights of the ridge portions 23 are equal to or larger than 0.5 times and less than or equal to 0.8 times the depths of the first transverse grooves 13a and 13b. For this reason, it is possible to prevent the drain property from declining, due to the forming of the ridge portions 23 on the first transverse grooves 13a and 13b.

Furthermore, among the wall surfaces forming the first transverse grooves 13a and 13b, both wall surfaces 22 which are opposed to each other in the circumferential direction S of the tire incline so as to gradually approach each other as they go to the bottom wall surface 21 side. As a result, it is possible to suppress deformation of the outer land portions 24 along the circumferential direction S of the tire, and the occurrence of heel and toe wear can be prevented. In addition, since the slope angles θ5 of the both wall surfaces 22 relative to the radial direction of the tire are equal to or larger than 15° and less than or equal to 25°, it is possible to prevent the wear resistance from declining due to the inclination of both wall surfaces 22.

In addition, the technical scope of the present invention is not limited to the above-mentioned embodiment, and various modifications can be made within the scope of the invention without departing from the spirit thereof.

For example, the numerical values such as the above-mentioned sizes and the angles may be suitably changed.

Furthermore, in the above-mentioned embodiment, the structure has been described in which the pattern shape on the tread portion 11 is in an axisymmetric shape on the basis of the equatorial portion CL of the tire and has a phase difference in the circumferential direction S of the tire at either side with the equatorial portion CL of the tire sandwiched therebetween. However, the pattern shape is not limited thereto, for example, but may be an asymmetric shape. Furthermore, in a case where the pattern shape is in the axisymmetric shape on the basis of the equatorial portion CL of the tire, the pattern shape need not have the phase difference in the circumferential direction S of the tire at either side with the equatorial portion CL of the tire sandwiched therebetween.

In addition, in the above-mentioned embodiment, although the sipes 18 and 19 are formed on the inner land portions 25 and the outer land portions 24, the sipes 18 and 19 need not be formed.

Furthermore, the ridge portions 23 need not be formed on the first transverse grooves 13a and 13b.

In addition, among the wall surfaces forming the first transverse grooves 13a and 13b, both wall surfaces 22 opposed to each other in the circumferential direction S of the tire are not limited to the above-mentioned embodiment, for example, but may extend in parallel along the diameter direction of the tire.

Next, verification tests regarding the above-mentioned working effects were performed.

First of all, the pneumatic tire provided in the tests will be described.

Figure 2:
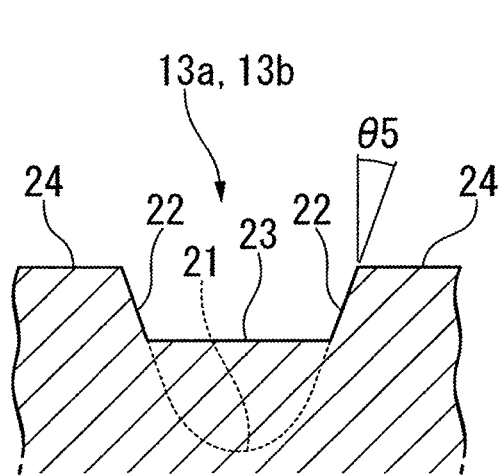
FIG. 2 is a sectional view when seen from an arrow direction which is taken by line A-A of the pneumatic tire shown in FIG. 1.

A structure which does not have the sipes 18 and the ridge portions 23 in the pneumatic tire 10 shown in FIG. 1 has been adopted as a pneumatic tire of embodiment 1, a structure which does not have the ridge portions 23 in the pneumatic tire 10 shown in FIG. 1 has been adopted as a pneumatic tire of embodiments 2, and a structure which is the same as the pneumatic tire 10 shown in FIG. 1 has been adopted as pneumatic tires of embodiments 3 and 4.

Furthermore, as a pneumatic tire of a comparative example, a structure has been adopted which does not have the sipes 18 and the ridge portions 23 in the pneumatic tire shown in FIG. 1, and in which the second transverse grooves 13c and 13d formed on the inner portion 15 of the tread portion 11 extend toward the one side in the circumferential direction of the tire, as they gradually go from the outer side of the width direction H of the tire to the inner side thereof, thereby being in parallel with the first transverse grooves 13a and 13b formed on the outer portion 14.

The sizes of each of the pneumatic tires of the embodiments 1 to 4 and the comparative example were 315/45 R22.5, the pneumatic tires were mounted on a vehicle with internal pressures of 900 kPa applied thereto, and the load per tire was set to be 2900 kg.

In addition, in each of the pneumatic tires of the embodiments 1 to 4 and the comparative example, the depths of the outer longitudinal grooves 12a and 12b were set to be 15 mm, the widths of the outer longitudinal grooves 12a and 12b were set to be 5 mm, the widths of the first transverse grooves 13a and 13b were set to be 10 mm, the depths of each of the first transverse grooves 13a and 13b and the second transverse grooves 13c and 13d were set to be 12 mm, and the widths of the outer land portions 24 were set to be 50 mm.

Furthermore, in regard to places with different sizes or the like in the pneumatic tires of each of the embodiments 1 to 4 and the comparative example, the places and the sizes will be indicated in table 1.

it was confirmed that the wear resistance could be improved as compared to embodiments 1 and 2 and the comparative example.

Furthermore, because in embodiment 4, among the wall surfaces forming the first transverse grooves 13a and 13b, both wall surfaces 22, which are opposed to each other in the circumferential direction S of the tire, incline so as to gradually approach each other as they go to the bottom wall surfaces 21 side, it was confirmed that the wear resistance could be further improved as compared to embodiment 3.

TABLE 1

|  | outer longitudinal groove | | first transverse groove | second transverse groove | | sipe | ridge portion | | outer land portion |
| --- | --- | --- | --- | --- | --- | --- | --- | --- | --- |
|  | ($\theta 1 + \theta 2$) (°) | amplitude in a tire width direction (mm) | $\theta 1$(°) | $\theta 2$(°) | width(mm) | width(mm) | width(mm) | height(mm) | angle $\theta 5$(°) |
| comparative example | 25 | 2 | 5 | 5 | 0.5 | none | none | none | 0 |
| embodiment 1 | 60 | 8 | 15 | 15 | 2.0 | none | none | none | 0 |
| embodiment 2 | 60 | 8 | 15 | 15 | 2.0 | 1.0 | none | none | 0 |
| embodiment 3 | 60 | 8 | 15 | 15 | 2.0 | 1.0 | 30 | 8 | 0 |
| embodiment 4 | 60 | 8 | 15 | 15 | 2.0 | 1.0 | 30 | 8 | 20 |

In addition, each of the pneumatic tires of the embodiments 1 to 4 and the comparative example was mounted on the vehicle, the vehicle was suddenly accelerated from a stop state on a road surface of an iron plate with a water film thickness of about 2 mm, and the time necessary for driving 100 m was measured to evaluate the wet acceleration performance.

Furthermore, the wet turning performance was evaluated by the feeling of a driver when the vehicle was circularly driven (radius of 20 m) at a speed of 30 km/h on the road surface of the iron plate.

In addition, the depths of the remaining grooves were measured to evaluate the wear resistance when the vehicle was driven ten thousand km at a speed of 60 km/h on a dry road surface.

Furthermore, the noise performance was evaluated by the feeling of a driver when the vehicle was driven on the dry road surface.

Each of the evaluations described above was evaluated with an index in which the result obtained with the pneumatic tire of the comparative example was set to be 100.

The results will be indicated in table 2.

TABLE 2

|  | wet acceleration performance | wet circling performance | wear resistance | noise performance |
| --- | --- | --- | --- | --- |
| comparative example | 100 | 100 | 100 | 100 |
| embodiment 1 | 105 | 105 | 100 | 110 |
| embodiment 2 | 107 | 107 | 100 | 107 |
| embodiment 3 | 107 | 107 | 105 | 107 |
| embodiment 4 | 107 | 107 | 115 | 107 |

As a result, it was confirmed that embodiment 1 is superior to the comparative example in wet acceleration performance, wet turning performance and noise performance.

In addition, because the sipes 18 were formed on the inner land portions 25 in embodiment 2, it was confirmed that the wet acceleration performance and the wet turning performance could be improved as compared to embodiment 1.

Furthermore, because the ridge portions 23 were installed in the first transverse grooves 13a and 13b in embodiment 3,

INDUSTRIAL APPLICABILITY

The occurrence of the noise can be suppressed while maintaining the wet performance of the pneumatic tire.

The invention claimed is:
1. A pneumatic tire comprising:
a tread portion,
a plurality of longitudinal grooves formed in the tread portion extending in a circumferential direction of the tire,
a plurality of transverse grooves formed in the tread portion extending in a width direction of the tire formed thereon,
a plurality of land portions formed by said longitudinal grooves and said transverse grooves, wherein
among the plurality of longitudinal grooves, outermost longitudinal grooves situated at either side in the width direction of the tire in the tread portion extend in the circumferential direction of the tire in a zigzag fashion,
among the plurality of transverse grooves, a plurality of first transverse grooves, which are situated at an outer portion connected from an outer side of the width direction of the tire to the outermost longitudinal grooves in the tread portion, extend from the outermost longitudinal grooves toward one side in the circumferential direction of the tire and is connected to the outermost longitudinal grooves, as it gradually extends from the outer side of the width direction of the tire to an inner side thereof,
a plurality of second transverse grooves, which are situated at an inner portion connected from the inner side of the width direction of the tire to the outermost longitudinal grooves in the tread portion, extend from the outermost longitudinal grooves toward the one side in the circumferential direction of the tire and are connected to the outermost longitudinal grooves, as it gradually extends from the inner side of the width direction of the tire to the outer side thereof,
a position of the circumferential direction of the tire at which the plurality of first transverse grooves are each situated in the outer portion and a position of the circumferential direction of the tire at which the plurality of second transverse grooves are each situated in the inner portion coincide with each other, the widths of the second transverse grooves are equal to or larger than 1.5 mm, and less than or equal to 5.0 mm, and narrower than those of the first transverse grooves, the outermost longitudinal grooves are configured such that a first longitudinal groove, which extends toward the one side in the width direction of the tire, as it gradually goes from the one side in the circumferential direction of the tire to another side thereof, and a second longitudinal groove, which extends toward another side in the width direction of the tire, as it gradually goes from the one side in the circumferential direction of the tire to another side thereof, and has a length shorter than that of the first longitudinal groove, are connected alternately along the circumferential direction of the tire, and the direction in the circumferential direction of the tire which the first longitudinal groove extends toward outside in the width direction thereof and the direction in the circumferential direction of the tire which the first transverse groove extends from the outermost longitudinal groove toward outside in the width thereof are the same.

2. The pneumatic tire according to claim 1, wherein widths of each of the first longitudinal groove and the second longitudinal groove are equal to or larger than 4 mm and less than or equal to 10 mm, and a sum of the slope angle of the first longitudinal groove relative to the circumferential direction of the tire and the slope angle of the second longitudinal groove relative to the circumferential direction of the tire is equal to or larger than 50° and less than or equal to 70°.

3. The pneumatic tire according to claim 1, wherein a pattern shape, which is divided and formed by the longitudinal grooves and the transverse grooves in the tread portion, is in an axisymmetric shape on the basis of an equatorial portion of the tire, and has phase differences in the circumferential direction of the tire on either side with the equatorial portion of the tire sandwiched therebetween.

4. The pneumatic tire according to claim 1, further comprising:

sipes extending in the width direction of the tire, in which are formed between the second transverse grooves which are adjacent to each other in the circumferential direction of the tire in the inner portion.

5. The pneumatic tire according to claim 1, wherein the depths of each of the first transverse grooves and the second transverse grooves are equal to or larger than 0.5 times and less than or equal to 1.0 times of the depths of the outer longitudinal grooves.

6. The pneumatic tire according to claim 1, wherein among the wall surfaces forming the first transverse grooves, both wall surfaces, which are opposed to each other in the circumferential direction of the tire, incline so as to gradually approach each other as they go to the bottom wall surface side, and the slope angles relative to a diameter direction of the tire are equal to or larger than 15° and less than or equal to 25°.

7. The pneumatic tire according to claim 1, wherein the first transverse grooves and the respective coinciding second transverse grooves form a v-shape in plan view of the tread portion.

8. The pneumatic tire according to claim 1, wherein slope angles of each of the first transverse grooves and the second transverse grooves relative to the width direction of the tire are larger than or equal to 10° and less than 25°.

* * * * *